US009009306B2

(12) United States Patent
He et al.

(10) Patent No.: US 9,009,306 B2
(45) Date of Patent: *Apr. 14, 2015

(54) METHOD, SYSTEM, CLIENT AND SERVER FOR LOCATING OPERATION NODES IN COMMUNICATION SYSTEM

(71) Applicant: Huawei Technologies Co., Ltd., Shenzhen (CN)

(72) Inventors: Jiangshui He, Shenzhen (CN); Kepeng Li, Shenzhen (CN); Xiaoqian Chai, Shenzhen (CN); Hongtao Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

This patent is subject to a terminal disclaimer.

(21) Appl. No.: 13/692,737

(22) Filed: Dec. 3, 2012

(65) Prior Publication Data

US 2013/0103799 A1     Apr. 25, 2013

Related U.S. Application Data

(63) Continuation of application No. 12/333,118, filed on Dec. 11, 2008, now Pat. No. 8,356,094.

(30) Foreign Application Priority Data

Aug. 7, 2006  (CN) .......................... 2006 1 0104263
Apr. 30, 2007 (CN) ................. PCT/CN2007/001481

(51) Int. Cl.
  *G06F 15/173*  (2006.01)
  *G06F 15/177*  (2006.01)
  *H04L 12/24*   (2006.01)
(52) U.S. Cl.
  CPC ............ *H04L 41/12* (2013.01); *H04L 41/0213* (2013.01); *Y10S 707/99933* (2013.01)
(58) Field of Classification Search
  CPC .... H04W 4/001; H04W 48/18; H04L 67/125; H04L 41/0213; H04L 41/0233
  See application file for complete search history.

(56) References Cited

U.S. PATENT DOCUMENTS

2003/0103484 A1 * 6/2003 Oommen et al. ............. 370/338
2005/0010585 A1   1/2005 Sahinoja et al.

(Continued)

FOREIGN PATENT DOCUMENTS

CN      1500331      5/2004
CN      1627761      6/2005

(Continued)

OTHER PUBLICATIONS

Written Opinion of the International Searching Authority issued in corresponding PCT Patent Application No. PCT/CN2007/001481, mailed Aug. 2, 2007.

(Continued)

*Primary Examiner* — Peling Shaw
(74) *Attorney, Agent, or Firm* — Huawei Technologies Co., Ltd.

(57) ABSTRACT

The present disclosure relates to the field of mobile communication technologies, and provides a method for locating operation nodes in a communication system. The method includes using an identifier in the received message to obtain an adjusted path from the root node of the management tree of the client to the standard management object corresponding to the identifier, using the message to obtain a relative path between the target operation node and the root node of the standard management object on the management tree, concatenating the adjusted path with the relative path, and locating the target operation node according to the concatenated path. The present disclosure also provides a system for locating operation nodes, a client for locating operation nodes in a communication system, and a server for performing management operations for clients.

13 Claims, 5 Drawing Sheets

(56) References Cited

U.S. PATENT DOCUMENTS

| | | | |
|---|---|---|---|
| 2005/0055397 A1 | 3/2005 | Zhe et al. | |
| 2005/0102281 A1* | 5/2005 | Takahashi | 707/3 |
| 2005/0232175 A1 | 10/2005 | Draluk et al. | |
| 2006/0234705 A1 | 10/2006 | Oommen | |
| 2007/0254634 A1 | 11/2007 | Costa-Requena et al. | |
| 2007/0300217 A1* | 12/2007 | Tunmer et al. | 717/177 |

FOREIGN PATENT DOCUMENTS

| | | |
|---|---|---|
| EP | 1 515 571 A2 | 3/2005 |
| JP | 2003051796 | 2/2003 |
| WO | 2005/004395 A1 | 1/2005 |
| WO | 2005/107217 A1 | 11/2005 |

OTHER PUBLICATIONS

International Search Report issued in corresponding PCT Application No. PCT/CN2007/001481; mailed Aug. 2, 2007.

Oommen, Paul et al. "IP Based Over-the-Air Device Management (IOTA-DMM) for cdma2000 Systems." *Nokia Openwave* Oct. 18, 2004, 1-48.

Supplementary European Search Report issued in corresponding European Patent Application No. 07 72 1054; issued Jul. 27, 2009.

International Preliminary Report on Patentability issued in corresponding PCT Application No. PCT/CN2007/001481; issued Feb. 10, 20009.

"OMA Device Management Protocol—Candidate Version 1.2-21" Open Mobile Alliance Ltd. Jun. 2006.

Office Action issued in related U.S. Appl. No. 12/333,118; dated Dec. 22, 2010.

Office Action issued in related U.S. Appl. No. 12/333,118; dated May 25, 2011.

Notice of Allowance issued in related U.S. Appl. No. 12/333,118; dated Sep. 14, 2012.

* cited by examiner

METHOD, SYSTEM, CLIENT AND SERVER FOR LOCATING OPERATION NODES IN COMMUNICATION SYSTEM

CROSS-REFERENCE TO RELATED APPLICATIONS

This application is a continuation of U.S. application Ser. No. 12/333,118, filed on Dec. 11, 2008, which is a National Stage of International Application No. PCT/CN2007/001481, filed Apr. 30, 2007. The International application claims priority to Chinese Patent Application No. 200610104263.2, filed Aug. 7, 2006. The aforementioned patent applications are hereby incorporated by reference in their entireties.

FIELD OF THE DISCLOSURE

The present disclosure relates to the field of mobile communication technologies, and in particular, to a method, system, client and server for locating operation nodes in a communication system.

BACKGROUND

With the development of mobile communication technologies, a terminal provides a plurality of complex functions, thus making it difficult for a server to manage clients.

The Open Mobile Alliance Device Management (OMA DM) standard provides a new management solution for a third party to manage and set the environment and the configuration information of terminal devices (such as mobile stations, and function objects in the terminal) in a wireless network, solves the problems of such terminal devices in the operation process, performs software installation and upgrades through wireless networks, provides more humanistic and individualized services, and improves the user experience. A third party may be a mobile operator, service provider, or an information management department of the partner.

The OMA DM solution provides a device management tree in order to organize the management objects in the client in the form of a tree. The device management server manages clients by operating management objects. The path from a root node to a target operation node on the management tree varies in the different clients. In the prior art, an operation node in a client is located through an absolute path. In this mode, each absolute path is applicable to a corresponding terminal.

The management operation for each client is performed through sessions between the device management server and each client. In the process of operating each client, the device management server first sends a notification message to the client, notifying the client to create a session. After receiving the notification, the client authenticates the server information in the message. After the authentication succeeds, the client reports client information and client authentication information to the server, and the server authenticates the client. After the authentication succeeds, the session creation stage is completed.

The device management server sends the nonce to be used in the next session and management operation commands. The client responds to the server. The server sends other management operation commands and obtains the management tree information in the client.

In conventional method as described in the foregoing management operation process, the server has to create a session connection with each client separately in view of different paths directed to the target operation nodes on different client, obtain the detailed management tree information of each client, send a proper management operation message to each client, and keep the session connection during the management, when the device management server performs the same management operation for a batch of clients. Consequently, the quantity of management operation messages to be sent is large thereby resulting in inefficient processing.

SUMMARY

A method, system, client and server for locating operation nodes in a communication system make a management operation message suitable for the batch of clients performing the same management operations and improve the processing efficiency.

A method for locating operation nodes in a communication system in an embodiment of the present disclosure includes using an identifier in the received message to obtain an adjusted path from the root node of the management tree of the client to the standard management object corresponding to the identifier; using the message to obtain a relative path between the target operation node and the root node of the standard management object on the management tree; concatenating the adjusted path with the relative path; and locating the target operation node according to the concatenated path.

A client for locating operation nodes in a communication system in an embodiment of the present disclosure may include an identifier locating unit, adapted to use the identifier of the standard management object in the message to obtain an adjusted path from the root node of the management tree of the client to the standard management object corresponding to the identifier a relative path identifying unit, adapted to obtain a relative path between the target operation node in the message and the root node of the standard management object on the management tree, and a path connecting unit, adapted to concatenate the adjusted path obtained by the identifier locating unit with the relative path obtained by the relative path identifying unit and locate the target operation node.

A communication system for locating operation nodes in an embodiment of the present disclosure may include a server, further comprising a unified locating communication unit, adapted to send the relative path between the target operation node and the root node of the standard management object on the management tree of the client as well as the identifier of the standard management object to the client, and a client, further comprising a identifier locating unit, adapted to use the identifier of the standard management object in the message to obtain an adjusted path from the root node of the management tree of the client to the standard management object corresponding to the identifier, a relative path identifying unit, adapted to obtain a relative path between the target operation node in the message and the root node of the standard management object on the management tree, and a path connecting unit, adapted to concatenate the adjusted path obtained by the identifier locating unit with the relative path obtained by the relative path identifying unit and locate the target operation node.

A server for managing a client in an embodiment of the present disclosure may include a storing unit, adapted to store the information about the relative path between the root node of the standard management object on the management tree of the client and each target operation node below the root node, a unified location communication unit, adapted to send the same management operation message to multiple clients, in which the management operation message carries the relative path between the target operation node and the root node of the standard management object on the management tree of the client, and an identifier of the standard management object, and a feedback receiving unit, adapted to receive, from multiple clients mentioned above, the results of management operations performed according to the management operation information.

The method under the present disclosure sends the same management operation message to a batch of clients and performs the same management operation for a batch of clients, thus avoiding the problems caused by difference of absolute paths directed to the target operation nodes on different terminals, improving the processing efficiency and reducing the waste of mobile resources.

DETAILED DESCRIPTION

For ease of description, "adjusted path" hereinafter refers to the path between the root node of the management tree of the client and the standard management object corresponding to the identifier; and "relative path" hereinafter refers to the path between the target operation node and the root node of the standard management object on the management tree.

Detailed below is a method provided in an embodiment of the present disclosure. In order to either locate a target operation node without knowing the structure of the management tree of the client or to locate target operation nodes of different paths on the management tree of the different clients, the operation of locating the relative path between the target operation node and the root node of the standard management object on the management tree is separated from the operation of locating the adjusted path between the root node of the management tree of the client and the standard management object.

In the standard management objects of the different clients, the target operation nodes of the same operation have the same relative path on different management trees of the different clients. The inconsistency of paths among management trees of the different clients occurs only on the adjusted path between the root node of the management tree and the standard management object. The inconsistency of the adjusted path can be solved via an identifier of the standard management object.

In an OMA DM standard, a unique identifier is registered for a standard management objects in an Open Mobile Naming Authority (OMNA). The unique identifier corresponds to a Data Type Definition (DTD) file. The standard management objects corresponding to the same target operation node have the same unique identifier among all clients. An identifier of the standard management object is added in the sent message. Through the identifier in the received message, the client can locate the adjusted path between the root node of its own management tree and the standard management object.

Therefore, when performing the same management operation for a batch of clients, the device management server adds a relative path (between the root node of the standard management object on the management tree and the target operation node) and the identifier of the standard management object to the client. The client locates the adjusted path of the standard management object on the management tree through the identifier and concatenates the adjusted path with the relative path in the message to obtain a complete path and locate the target operation node. If the standard management object has multiple embodiments on the management tree of the client (namely, the client can find multiple adjusted paths according to the same standard management object identifier), the client should locate a unique adjusted path according to the name of the root node of the standard management object in the relative path.

Figure 1:
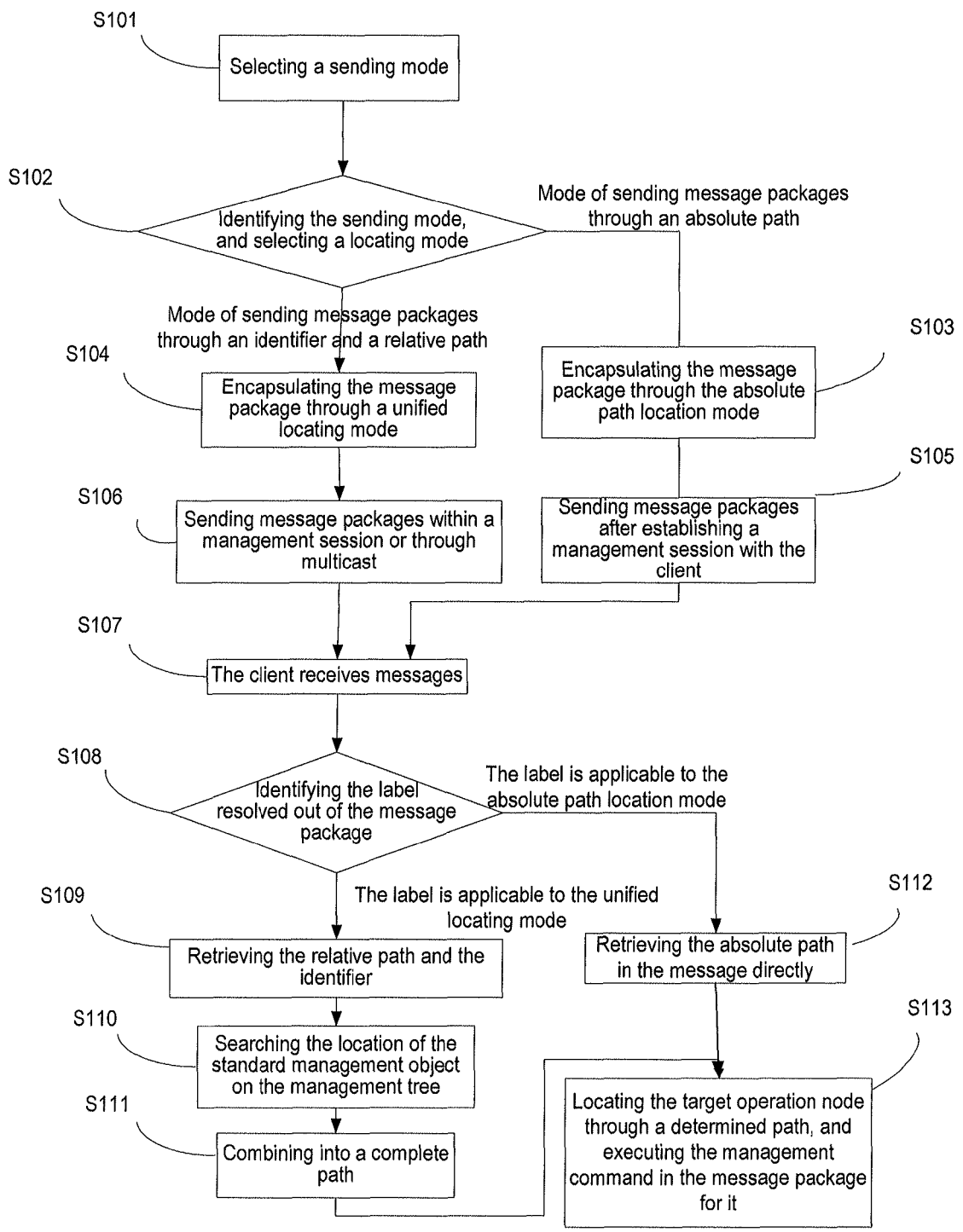
FIG. 1 is a flowchart of an embodiment of the present disclosure.

Described below is an embodiment of the method under the present disclosure. For ease of description, a mobile terminal hereinafter refers to a client. This embodiment aims to locate a target operation node (named "Update") in a mobile terminal. As shown in FIG. 1, the process of sending messages is described hereinafter.

In S101, a mode of sending message packages is selected.
A management operation message package may be sent (1) by using an absolute path (locating the target operation node on the management tree of the client, starting from the root node of the management tree based on the structure of the management tree); or (2) by using an identifier and a relative path.

For the sending mode (1), a bidirectional interaction session may first be established, and then the absolute path information is sent in the session. For the sending mode (2), the identifier and the relative path information may be sent in the session, or be sent through a unidirectional channel such as multicast or unicast.

In this embodiment, the identifier and the relative path information is sent through a unidirectional multicast package.

In S102, the sending mode is identified and a locating mode is selected.

If the sending mode is based on an absolute path, S103 is performed. If the sending mode is based on an identifier and a relative path, S104 is performed.

In S103, the message package based on an absolute path-based locating mode is encapsulated and then S105 is performed.

The device management server encapsulates the message package based on the absolute path-based locating mode.

In S104, the message package based on a unified locating mode is encapsulated, and then S106 is performed.

The device management server encapsulates the message package based on the unified locating mode. The encapsulation process is detailed hereinafter.

Figure 2:
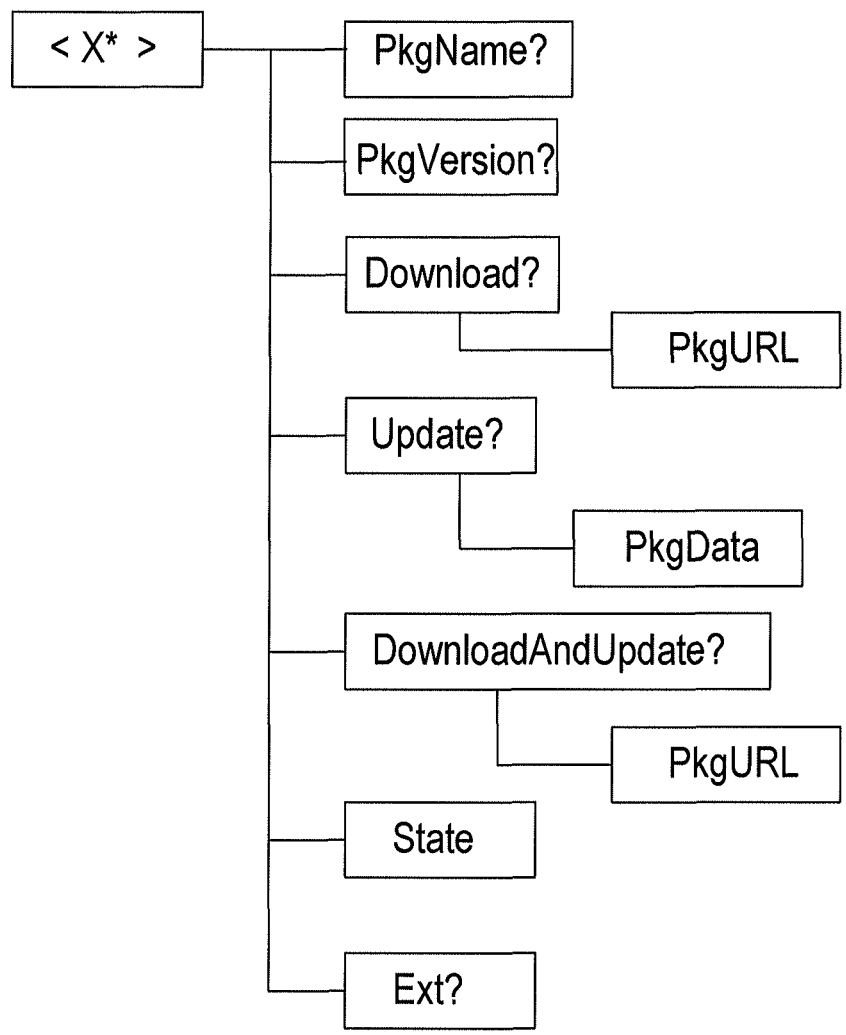
FIG. 2 shows the structure of a standard management object "FUMO" in an embodiment of the present disclosure.

For example, suppose that the identifier of the standard management object corresponding to the target operation node in this operation is "urn:oma:mo:oma-fumo:1.0", and the standard management object corresponding to the identifier is a Firmware Update Management Object (FUMO). The structure of an FUMO is shown in FIG. 2. In FIG. 2, the root node of the standard management object is a node whose placeholder is "X*". On the management tree of each terminal, the placeholder of the root node of the standard management object is represented by a predefined root node name on the management tree. Each standard management object has different root node names under the same parent node on the management tree.

Figure 3:
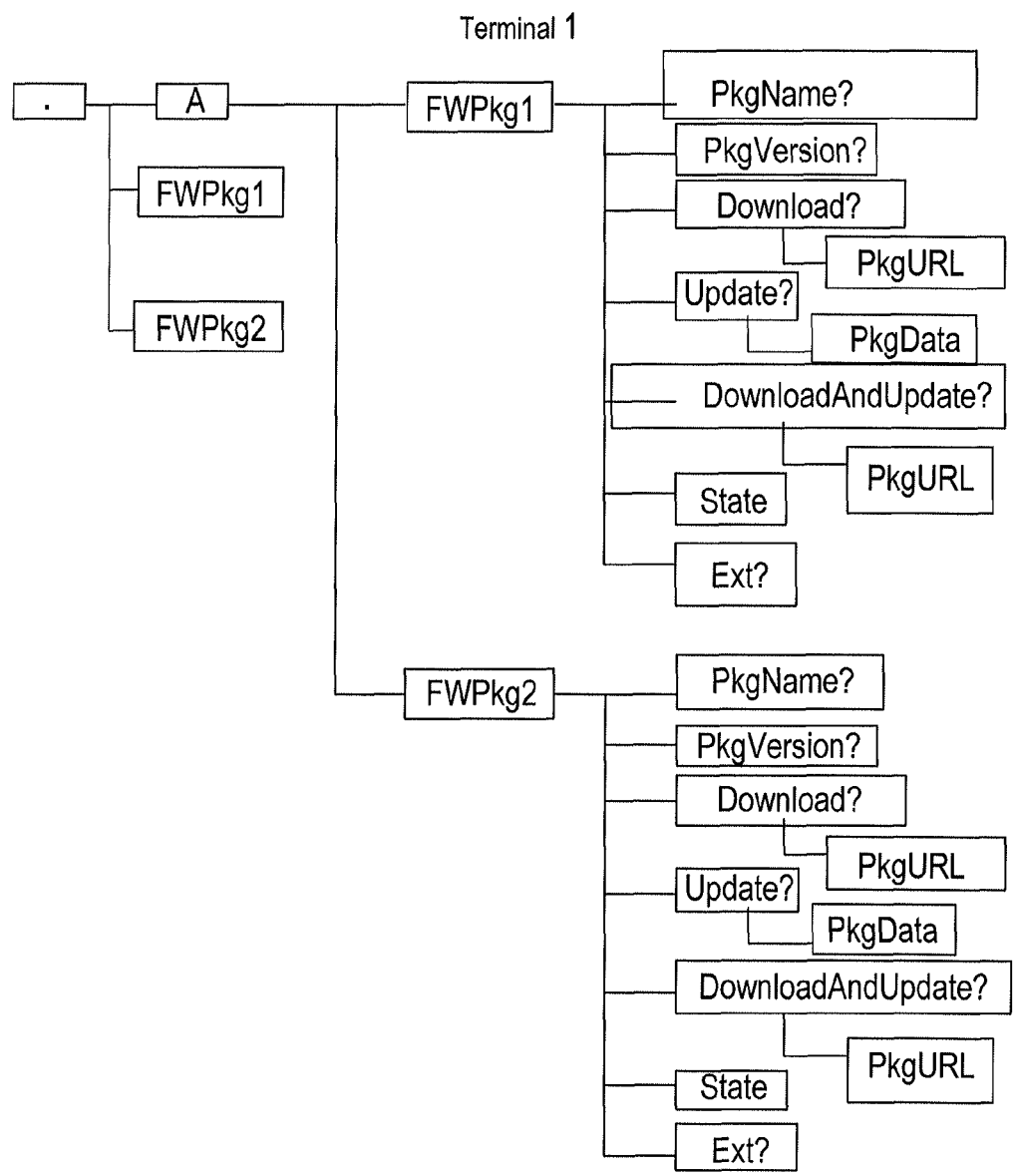
FIG. 3 shows the structure of a management tree of terminal 1 in an embodiment of the present disclosure.
Figure 4:
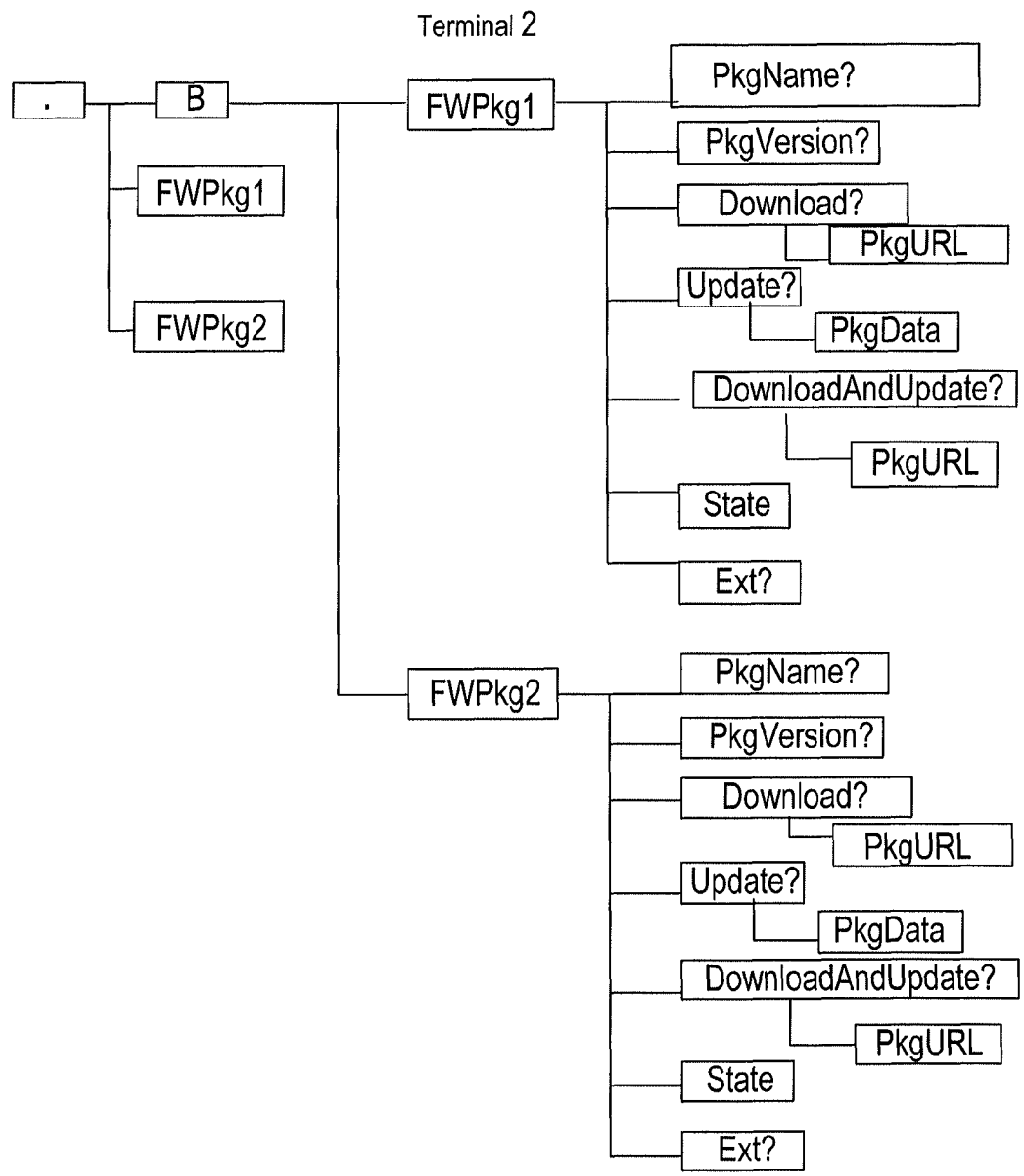
FIG. 4 shows the structure of a management tree of terminal 2 in an embodiment of the present disclosure.

FIG. 3 shows the management tree structure of terminal 1, and FIG. 4 shows the management tree structure of terminal 2. There are two standard management objects "FUMO" on the management tree of terminal 1. The root node names of FUMOs on the management tree of terminal 1 are FWPkg1 and FWPkg2, respectively. There are also two standard management objects "FUMO" on the management tree of terminal 2. The root node names of FUMOs on the management tree of terminal 2 are FWPkg1 and FWPkg2 respectively. In terminal 1 and terminal 2, the operations corresponding to the target operation nodes "Update" in the respective FUMOs are different. It is understandable that in any terminal, multiple embodiments may exist for the same standard management object that the target operation node belongs to. The value of label "MOId" is a unique identifier of the standard management object registered in the OMNA. The label "RelURI" indicates a relative path between the target operation node and the root node of the standard management object on the management tree. The detailed commands are as follows:

```
<Exec>
    <CmdID>3</CmdID>
        <Item>
            <Target>
                <MOId>urn:oma:mo:oma-fumo:1.0</MOId><!—the identifier is encapsulated in the MOId label—>
                <RelURI>FWPkg1/Update</RelURI><!—the relative path is encapsulated in the RelURI label—>
            </Target>
        </Item>
</Exec>
```

In S105, the device management server establishes a device management session with the client according to the method described in "Background of the Disclosure" above, and then the process proceeds to S107.

In S106, the encapsulated message package is sent within a management session or sent through multicast.

If the message package is sent through multicast, the device management server sends the message package encapsulated in S104 to the broadcast center, and notifies the broadcast center of the terminals that need to receive multicast messages. The broadcast center creates a multicast list in view of the terminals that need to receive multicast messages and sends an encapsulated message package to the terminals in the multicast list.

In S104, without extending the existing label, the identifier and the relative path may also be encapsulated in the existing label. For example, if labels "Type" and "LocURI" already exist, the identifier is encapsulated into the "Type" label and the relative path is encapsulated into the "LocURI" label. The detailed commands are as follows:

```
<Exec>
    <CmdID>3</CmdID>
        <Item>
            <Target>
                <Type> urn:oma:mo:oma-fumo:1.0</Type><!—the identifier is encapsulated in the "Type" label—>
                <LocURI> FWPkg1/Update</LocURI><!—the relative path is encapsulated in the "LocURI" label—>
            </Target>
        </Item>
</Exec>
``` object. The standard management objects corresponding to such embodiments have the same identifier, but different root node names (for example, one root node name is FWPkg1 and the other is FWPkg2). In a scenario of operating a node named "Update" (target operation node) under an FUMO management object of a root node named "FWPkg1", the relative path directed to the target operation node on the management tree of both terminal 1 and terminal 2 is "FWPkg1/Update".

Two labels "MOId" and "RelURI" are defined. The identifier is encapsulated into the label "MOId", and the relative path is encapsulated into the label "RelURI". The label "MOId" is adapted to indicate the standard management In S104, the identifier and the relative path may also be encapsulated into the same label. The label may be an existent or newly defined label. The identifier is encapsulated in a predefined symbol of the label, and serves as part of the label. For example, the identifier and the relative path are stored in the "Type" label, and the identifier is encapsulated in a predetermined special symbol such as [ ] or { } in the "Type" label. The predetermined symbol for encapsulating the identifier of the standard management object must not serve to identify an operation node so that the terminal that receives the message can resolve the identifier successfully. The detailed commands are as follows:

```
<Exec>
    <CmdID>3</CmdID>
        <Item>
            <Target>
                <LocURI>[ urn:oma:mo:oma-fumo:1.0 ] FWPkg1/Update
                </LocURI><!—the identifier is encapsulated in a symbol "[ ]" in a "LocURI" label;
the relative path is encapsulated in a "LocURI" label—>
            </Target>
        </Item>
    </Exec>
```

In S104, the device management server may encapsulate the identifier, the root node name of the standard management object sub-tree in the relative path, and the operation path obtained after the root node name in the relative path is replaced by a placeholder into a label. The label may be an existent or newly defined label. For example, two labels "Type" and "LocURI" have been defined in DM protocol, and a new label "MOName" is defined; the identifier is encapsulated into the "Type" label, the root node name in the relative path is encapsulated in the "MOName" label, and the operation path is encapsulated in the "LocURI" label. The detailed commands are as follows:

standard management object in the relative path, operation path, and identifier are encapsulated in the message package in other mode aforementioned.

For example, suppose that in S106, the device management server encapsulates the following three items into a label: (i) the identifier; (ii) the root node name "FWpkg1" of the standard management object in the relative path on the management tree; and (iii) the operation path "x/Update" obtained after the root node name in the relative path is replaced by a relative path indicator (for example, a placeholder "x") (namely, the operation path between the relative path indicator and the target operation node), and sends the label to the

```
<Exec>
    <CmdID>3</CmdID>
        <Item>
            <Target>
                <Type> urn:oma:mo:oma-fumo:1.0</Type><!—the identifier is encapsulated
in the "Type" label—>
                <MOName> FWPkg1/</MOName><!—the root node name in the relative path
is encapsulated in the "MOName" label—>
                <LocURI>x/Update</LocURI><!—the operation path, obtained after the root
node name in the relative path is replaced with a placeholder, is encapsulated into the "LocURI"
    label—>
            </Target>
        </Item>
    </Exec>
```

After receiving the message package, which encapsulates the target operation node in the unified locating mode, sent by the broadcast center, the client handles the data in the message package.

In S107, the mobile terminal receives the message.

In S108: the label resolved out of the message package is identified.

The mobile terminal resolves the content in the received message package and determines that the path in the message package is a relative path encapsulated in the unified locating mode according to resolved label. If the label is of the unified locating mode, the process proceeds to S109. If the label is of the locating mode based on an absolute path, the process proceeds to S112.

In S109, the relative path and identifier are retrieved.

From the message package, the mobile terminal retrieves the relative path of the standard management object containing the operation node and the unique identifier of the standard management object. The mobile terminal resolves the "MOId" label, whose content is "urn:oma:mo:oma-fumo:1.0" in this embodiment, in the message package. If the identifier is encapsulated in a symbol in the label, the mobile terminal needs to resolve the symbol. Moreover, the mobile terminal resolves the "RelURI" label whose content is "FWPkg1/Update".

The resolving process is the same when the relative path and identifier are encapsulated in the message package in the aforementioned mode or when the root node name of the client. In this case, the client needs to replace the relative path indicator (for example, placeholder "x") in the operation path with the root node name "FWpkg1" according to the content of the received message, and restore the relative path "FWpkg1/Update".

In S110, the location of the standard management object on the management tree is searched out or identified.

The mobile terminal locates the standard management object on the management tree by using the identifier in the message. Among the nodes of the management tree, the identifier of the standard management object is stored in the attributes of the root node of the standard management object on the management tree. Through the identifier, the location of the standard management object corresponding to the identifier is searched out on the management tree, thus obtaining an adjusted path which runs from the root node of the management tree to the root node of the standard management object "FUMO". As shown in FIG. 3, terminal 1 searches for the adjusted path on its management tree. Two adjusted paths from the root node of the management tree on terminal 1 to the standard management object "FUMO" are "./A/FWPkg1" and "./A/FWPkg2". The terminal compares the final node names "FWPkg1" and "FWPkg2" of the two adjusted paths with the root node names in the relative path. The adjusted path whose final node name is the same as the root node name serves as a unique adjusted path, thus obtaining a unique adjusted path "./A/FWPkg1". If the management tree of the terminal contains only one standard management object corresponding to the identifier, it is not necessary to locate further through the root node name in the relative path. If the standard management object can not be found on the management tree, the process is ended.

In S111, a complete path is formed and S113 is performed.

The terminal concatenates the adjusted path of the located standard management object with the relative path of the standard management object containing the target operation node in the message package. As mentioned above, both the final node of the adjusted path and the root node of the relative path are the root node of the standard management object on the management tree, namely, the final node name of the adjusted path is the same as the root node name of the relative path. Therefore, in the process of concatenating the adjusted path with the relative path, the identical node names are overwritten, thus obtaining a complete path directed to the target operation node.

The path to the target operation node on the management tree of terminal 1 is "./A/FWPkg1/Update".

As obtained in the same way, the path to the target operation node on the management tree of terminal 2 is "./B/FWPkg1/Update".

The path to the target operation node "Update" is located successfully. Subsequently, proper management operations are performed according to the located complete path.

In S112, the client retrieves the absolute path from the management command element in the message directly.

In S113, the client locates the target operation node through the path determined above, and executes the management command in the message package for the target operation node.

Those skilled in the art will appreciate that all or part of the steps in the preceding embodiments can be completed through a program which instructs related hardware. The program may be stored in a readable storage medium, for example, ROM/RAM, disk and CD in a computer.

Figure 5:
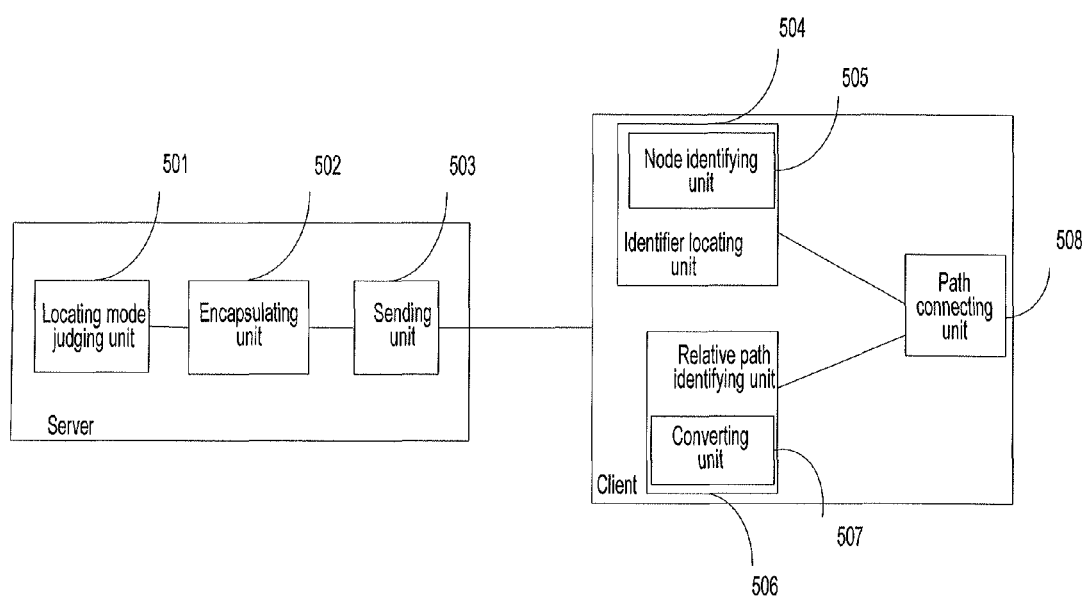
FIG. 5 shows a system provided in an embodiment of the present disclosure.

As shown in FIG. 5, a system for locating operation nodes in an embodiment of the present disclosure contains a client and a server.

The server includes a locating mode judging unit 501, adapted to select an encapsulation mode according to the determined sending mode, and notify the encapsulating unit 502 of the selected encapsulation mode, an encapsulating unit 502, adapted to encapsulate the relative path between the target operation node and the root node of the standard management object on the management tree of the client as well as the identifier of the standard management object into a message package and send the message package to the sending unit 503, in the case that the locating mode judging unit 501 selects the unified locating mode as an encapsulation mode, and a sending unit 503, adapted to send the relative path and the identifier to the client.

The aforementioned locating mode judging unit 501, encapsulating unit 502, and sending unit 503 make up a unified locating communication unit which is adapted to send the relative path between the target operation node and the root node of the standard management object on the management tree of the client as well as the identifier of the standard management object to the client.

The client further includes an identifier locating unit 504, adapted to use the identifier of the standard management object in the message to obtain an adjusted path between the root node of the management tree of the client and the standard management object corresponding to the identifier, and send the adjusted path to the path connecting unit 508, a relative path identifying unit 506, adapted to obtain a relative path between the target operation node in the message and the root node of the standard management object on the management tree, and send the relative path to the path connecting unit 508, and a path connecting unit 508, adapted to concatenate the adjusted path with the relative path, and locate the target operation node.

The encapsulating unit 502 of the server in an embodiment of the system under the present disclosure is embodied as a first encapsulating unit, adapted to encapsulate the relative path and the identifier into different newly defined labels, or into different existing labels, or a second encapsulating unit, adapted to encapsulate the relative path into an existing or newly defined label, and encapsulate the identifier into a predetermined symbol in the label, or a third encapsulating unit, adapted to encapsulate the following three items into different newly defined labels or different existing labels: (i) the identifier; (ii) the root node name of the standard management object in the relative path on the management tree; and (iii) the operation path obtained after the root node name in the relative path is replaced by a placeholder (which is a type of relative path indicators) (namely, the operation path between the relative path indicator and the target operation node).

In the system under the present disclosure, the sending unit 503 of the server is embodied as a multicast sending unit, adapted to send the relative path and the identifier to the client through multicast.

The relative path identifying unit 506 of the client in an embodiment of the system under the present disclosure contains an information obtaining unit (not illustrated) and a converting unit 507. The information obtaining unit is adapted to obtain the root node name of the standard management object on the management tree, and obtain the operation path between the placeholder and the target operation node, from the message. The converting unit 507 is adapted to substitute the root node name obtained by the information obtaining unit for the placeholder in the operation path to obtain the relative path.

In the system under the present disclosure, the identifier locating unit 504 of the client is adapted to search the management tree of the client for the standard management object corresponding to the identifier by using the identifier, and obtain an adjusted path. More particularly, an identifier locating unit 504 includes a searching unit, adapted to search the management tree of the client for the standard management object corresponding to the identifier by using the identifier, and an adjusted path identifying unit, adapted to obtain an adjusted path between the root node of the management tree of the client and the standard management object searched out by the searching unit.

Further, the identifier locating unit 504 of the client in an embodiment of the system under the present disclosure contains a node identifying unit 505.

If more than one adjusted path is searched out, the node identifying unit 505 is adapted to obtain the final node name of each adjusted path, compare the root node name obtained by the relative path identifying unit 506 with each final node name, and use the adjusted path whose root node name is identical to the final node name as a unique adjusted path, and send the unique adjusted path to the path connecting unit 508.

Further, an embodiment of the present disclosure provides a client for locating operation nodes in a communication system, where the client is a client in the foregoing system.

Further still, an embodiment of the present disclosure provides a server for managing the clients, where the server is a server in the foregoing system.

It is understandable to those skilled in the art that a relative path is known before the server sends the relative path between the target operation node and the root node of the standard management object on the management tree of the client to a batch of clients and sends the identifier of the standard management object. Therefore, a server generally contains a storing unit for storing the information about the relative path between the root node of the standard management object on the management tree of the client and each target operation node under the root node.

Moreover, when the server sends a management operation message with the same relative path and identifier to a batch of clients through a unified locating communication unit (which contains a locating mode judging unit, an encapsulating unit and a sending unit), each client reports the result of the management operation for the target operation node to the server after locating the operation node and executing the corresponding operation according to the received management operation information. Generally, a server contains a feedback receiving unit, adapted to receive, from each client, the results of management operations performed for the target operation nodes involved in the management operation information. If the server encapsulates message packages through the absolute path-based locating mode, the feedback receiving unit of the server receives the management operation result fed back by a client with respect to a management operation message. If the server encapsulates message packages through the unified locating mode, the feedback receiving unit of the server receives management operation results fed back by a batch of clients with respect to a management operation message.

Further, a server in this embodiment contains a storing unit, a unified locating communication unit and a feedback receiving unit. The storing unit is adapted to store the information on the relative path between the root node of the standard management object on the management tree of the client and each target operation node below the root node. The unified locating communication unit is adapted to send the same management operation message to multiple clients, where the management operation message carries the relative path between the target operation node and the root node of the standard management object on the management tree of the client, and carries the identifier of the standard management object. The feedback receiving unit is adapted to receive, from multiple clients mentioned above, the results of management operations performed according to the management operation information.

Further, a unified locating communication unit contains a locating mode judging unit, an encapsulating unit, and a sending unit. The locating mode judging unit is adapted to select an encapsulation mode according to the determined sending mode, notifying the encapsulating unit of the selected encapsulation mode. The encapsulating unit is adapted to encapsulate the relative path between the target operation node and the root node of the standard management object on the management tree of the client as well as the identifier of the standard management object into a management operation message package in the case that the locating mode judging unit selects the unified locating mode as an encapsulation mode. The sending unit is adapted to send the management operation message package encapsulated by the encapsulating unit to multiple clients.

Therefore, the embodiments of the present disclosure send the same management operation message to a batch of clients and perform the same management operation for a batch of clients, thus avoiding the problems caused by difference of absolute paths directed to the target operation nodes on different terminals, improving the processing efficiency and reducing the waste of mobile resources.

Moreover, the unified locating mode is applied to the target operation node, so that the management operation message package can be sent to the terminal through multicast, thus drastically relieving the load of the server.

It is apparent that those skilled in the art can make various modifications and variations to the method and system under the present disclosure without departing from the spirit and scope of the disclosure. The disclosure shall cover all the modifications and variations provided that they fall in the scope of protection defined by the following claims or their equivalents.

What is claimed is:

1. A method for locating operation nodes in a communication system, comprising:
receiving, by a client, a message comprising information regarding an identifier and a relative path, for locating a target operation node in a device management tree in the client based. on OMA DM standard, wherein the identifier is used to identify a standard management object of the device management tree of the client, wherein the identifier is the same for the same standard management object in each of the device management trees of different clients, wherein the relative path is a path between the target operation node and a root node of the standard management object of the device management tree, and wherein the relative path is the same for the same standard management object in each of the device management trees of the different clients;
searching the client, the device management tree of the client for the standard management object corresponding to the identifier to obtain a corresponding adjusted path between a root node of the device management tree and the root node of the standard management object of the device management tree, wherein a corresponding adjusted path of the each of the device management trees of the different clients is obtained according to the identifier;
concatenating, by the client, the corresponding adjusted path with the relative path to obtain a concatenated path; and
locating, by the client, the target operation node according to the concatenated path.

2. The method of claim 1, wherein the received message is encapsulated through a unified locating mode.

3. The method of claim 1, wherein the received message comprises two labels "MOId" and "RelURI", and wherein the identifier is encapsulated into the label "MOId" and the relative path is encapsulated into the label "RelURI".

4. The method of claim 1, wherein the information on the relative path comprises a root node name of the standard management object on the management tree, and an operation path between the relative path indicator and the target operation node; and
the method further comprising:
obtaining the relative path by using the received message; and
substituting the root node name of the standard management object for the relative path indicator in the operation path to obtain the relative path.

5. The method of claim 4, further comprising:
obtaining a final node name of each corresponding adjusted path, when obtaining a plurality of adjusted paths;
comparing the root node name in the relative path with the final node name in each corresponding adjusted path; and using one of the plurality of adjusted paths Whose root node name is the same as the final node name as a unique adjusted path.

6. The method of claim 1, wherein multiple clients receive the received message, and use the received message to locate target operation nodes.

7. A client for locating operation nodes in a communication system, comprising:
   an identifier locating unit, configured to use an identifier of a standard management object in a message to obtain a corresponding adjusted path between a root node of a device management tree of the client and a root node of the standard management object based on OMA DM standard, wherein the identifier is used to identify the standard management object of the device management tree of the client, and wherein the identifier is the same for the same standard management object in each of the device management trees of different clients;
   a relative path identifying unit, configured to obtain a relative path between a target operation node and the root node of the standard management object of the device management tree from the message, wherein the relative path is the same for the same standard management object in each of the device management trees of the different clients; and
   a path connecting unit, configured to concatenate the corresponding adjusted path obtained by the identifier locating unit with the relative path to obtain a concatenated path, and locate the target operation node according to the concatenated path.

8. The client of claim 7, wherein the relative path identifying unit comprises:
   an information obtaining unit, configured to obtain, from the message, a root node name of the standard management object on the management tree, and an operation path between a relative path indicator and the target operation node; and
   a converting unit, configured to substitute the root node name obtained by the information obtaining unit for the relative path indicator in the operation path to obtain the relative path.

9. The client of claim 7, wherein the identifier locating unit comprises:
   a searching unit, configured to use the identifier to search the management tree of the client for the standard management object; and
   an adjusting path identifying unit, configured to obtain the corresponding adjusted path between the root node of the management tree of the client and the standard management object searched out by the searching unit.

10. The client of claim 9, wherein the identifier locating unit further comprises: a node identifying unit configured, when a plurality of adjusted paths are searched out, to: obtain the final node name of each corresponding adjusted path, compare the root node name obtained by the relative path identifying unit with each final node name, use one of the plurality of adjusted paths whose root node name is the same as the final node name as a unique adjusted path, and send the unique adjusted path to the path connecting unit.

11. A method for locating operation nodes in a communication system, comprising:
   receiving, by a client, a message comprising information regarding an identifier and a relative path, for locating a target operation node in a device management tree in the client, wherein the identifier is unique and is registered for the same standard management objects in an Open Mobile Naming Authority (OMNA), wherein the relative path is a path between the target operation node and a root node of the standard management object of the device management tree;
   searching, by the client, the device management tree of the client for the standard management object corresponding to the identifier to obtain a corresponding adjusted path between a root node of the device management tree and the root node of the standard management object of the device management tree;
   concatenating, by the client, the corresponding adjusted path with the relative path to obtain a concatenated path; and
   locating, by the client, the target operation node according to the concatenated path.

12. The method of claim 11, wherein the received message is encapsulated through a unified locating mode.

13. The method of claim 11, wherein the received message comprises two labels "MOId" and "RelURI", the identifier is encapsulated into the label "MOId" and the relative path is encapsulated into the label "RelURI".

* * * * *

UNITED STATES PATENT AND TRADEMARK OFFICE
CERTIFICATE OF CORRECTION

| | | |
|---|---|---|
| PATENT NO. | : 9,009,306 B2 | Page 1 of 1 |
| APPLICATION NO. | : 13/692737 | |
| DATED | : April 14, 2015 | |
| INVENTOR(S) | : Jiangshui He et al. | |

It is certified that error appears in the above-identified patent and that said Letters Patent is hereby corrected as shown below:

Claims

On Column 12, Claim 1, line 19, delete the "." after the word "based"

Signed and Sealed this
Twenty-seventh Day of October, 2015

Michelle K. Lee
*Director of the United States Patent and Trademark Office*